L. A. OSGOOD.
SCALE.
APPLICATION FILED FEB. 7, 1920.
1,385,791.
Patented July 26, 1921.
2 SHEETS—SHEET 1.
Fig.1
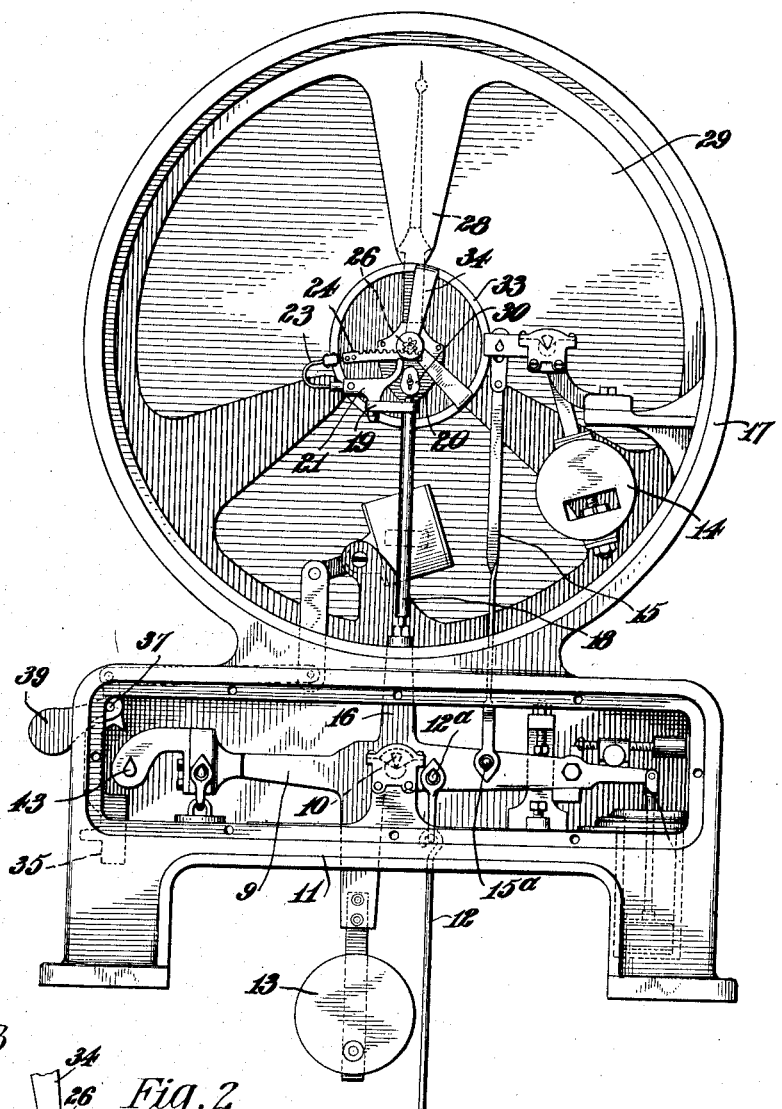
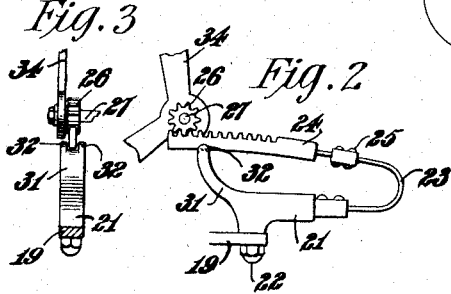
Fig.3  Fig.2
Inventor
Louis Ashley Osgood
By his Attorneys
Kerr Page Cooper + Hayward

L. A. OSGOOD.
SCALE.
APPLICATION FILED FEB. 7, 1920.

1,385,791.

Patented July 26, 1921.
2 SHEETS—SHEET 2.

Inventor
Louis Ashley Osgood
By his Attorneys
Kerr Page Cooper + Hayward

UNITED STATES PATENT OFFICE.

LOUIS ASHLEY OSGOOD, OF DAYTON, OHIO, ASSIGNOR, BY MESNE ASSIGNMENTS, TO INTERNATIONAL SCALE COMPANY, OF DAYTON, OHIO, A CORPORATION OF ILLINOIS.

SCALE.

1,385,791.  Specification of Letters Patent.  Patented July 26, 1921.

Application filed February 7, 1920. Serial No. 356,930.

*To all whom it may concern:*

Be it known that I, LOUIS ASHLEY OSGOOD, a citizen of the United States, residing at Dayton, in the county of Montgomery and State of Ohio, have invented certain new and useful Improvements in Scales, of which the following is a full, clear, and exact description.

In automatic scales of the type in which the weight is indicated by a pivoted index or pointer moving over a graduated dial or chart, the index is usually actuated through the medium of a pinion which is connected to the index and meshes with a rack moving in harmony with a load-actuated part, for example the scale beam. Evidently the elimination of backlash in the rack and pinion is important from the standpoint of accurate weighing, and hence it is necessary to keep the two in good mesh with each other. On the other hand, it is important to keep the operation practically frictionless. Moreover, these conditions should be maintained substantially uniform throughout the entire range of movement of the rack, since otherwise the scale will not be equally accurate at all loads. It is accordingly the chief object of my present invention to provide a rack and pinion system which will fulfil in a satisfactory manner the conditions outlined. To this end I avoid the use of a pivoted and counterbalanced rack, as anything but a knife-edge pivot (which is in general not practicable at this point) is a fertile source of friction especially in situations where the scale cannot be given the best of care, and the counterbalancing weight tempts the user to try to adjust it when no necessity for re-adjustment exists. In the preferred form of my invention I make the rack arc-shaped, on a circle concentric with the pivot of the beam or lever by which the rack is actuated, and I mount the rack on a light spring which, when flexed by the weight of the rack, has just enough tension to keep the rack in proper mesh with the pinion.

The form briefly outlined above is illustrated in the acompanying drawings, in which:

Figure 1 is a rear view, with the rear walls of the beam and dial housing removed.

Fig. 2 is a detail front view of the intermeshing rack and pinion.

Fig. 3 is a detail side view of the same.

Figure 6:
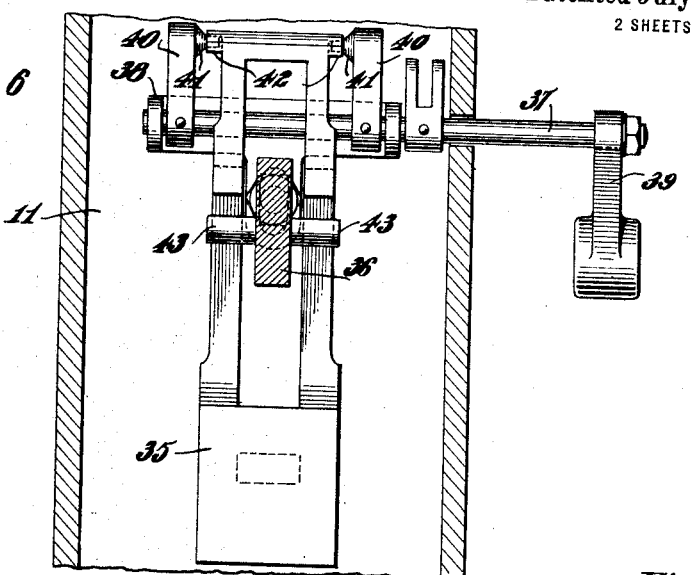
Figure 4:
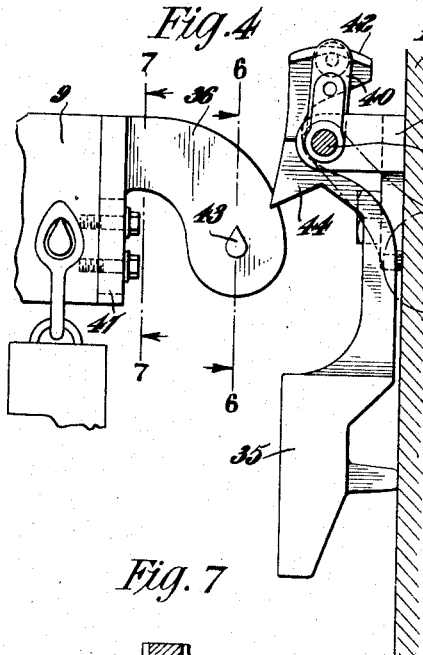
Fig. 4 is a detail side view of the mechanism for applying an additional weight, known as a capacity weight, to the scale beam or other appropriate lever, for the purpose of increasing the capacity of the scale.
Figure 7:
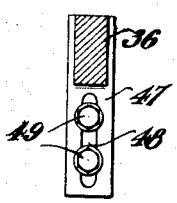

Figs. 6 and 7 are cross sections on lines 6—6 and 7—7, respectively, of Fig. 4.

The scale beam 9 is fulcrumed at 10 in the beam housing 11 and is connected by the draft or steelyard rod 12 to the scale platform, not shown. The rocking of the beam (clockwise) by the downward pull of the draft rod is resisted by the lower counterpoise 13 carried by the beam itself on the other side of its fulcrum, and by the upper pendulum 14 connected to the beam by the link 15.

The scale beam 9 has an inflexible arm 16, strictly radial to the fulcrum 10 and extending upwardly into the dial housing 17. This arm is preferably made in two parts, the upper part 18 being screwed into the lower and secured by a lock nut to afford convenient and accurate adjustment of the length of the whole. On top of the arm is a lateral finger 19, secured by a screw 20 to permit rotary adjustment of the finger in a horizontal plane, especially when the upper part of the arm is screwed into or out of the lower part to adjust the length of the arm relatively to the center of the dial. On the outer end of finger is a roughly L-shaped carrier 21 secured in place by means of a screw 22 (see Figs. 2 and 3) to permit pivotal adjustment in the same manner as the supporting finger 19. In the horizontal portion of the carrier is fixed one end of a loop-spring 23 to the other end of which is fixed a rack 24 held in adjusted position on the spring by means of screws 25. This rack is arc-shaped and is concentric with the fulcrum 10, and is held by the spring 23 in mesh with the pinion 26 which is fixed on the shaft 27 of the pointer or index 28. It will therefore be seen that as the scale beam 9 rocks, the pinion is rotated and the pointer thereby swung over the dial 29. Being arc-shaped and concentric with the center on which it swings, the rack is in effect a part of a gear and its depth of mesh with the pinion constant in all positions. This depth of mesh is controlled by the tension of the spring, which can be easily regulated by bending it toward or from the carrier 21 as may be necesary. The spring is an advantageous means of supporting the rack, as it permits the arm 18 to contract and expand under the influence of temperature changes without material variation in position of the rack relatively to the pinion, the spring yielding as the arm lengthens and expanding as the arm contracts. The spring is preferably just stiff enough to hold the rack well in mesh with the pinion at all times, and the pointer is nicely balanced, as by means of a radially adjustable weight 30, Fig. 1, so as to minimize the tendency of the pinion to cam the rack out of mesh. The upwardly extending member 31 of the carrier 21 has at its end a pair of lugs 32, Figs. 2 and 3, one on each side of the rack to prevent disengagement of the rack and the pinion in case of transverse vibration of the rack by a sudden shock or jar. The pointer and pinion shaft 27 is journaled at the front in the center member 33 of the dial housing and at the rear in the two-armed spider 34 carried by said member.

Figure 5:
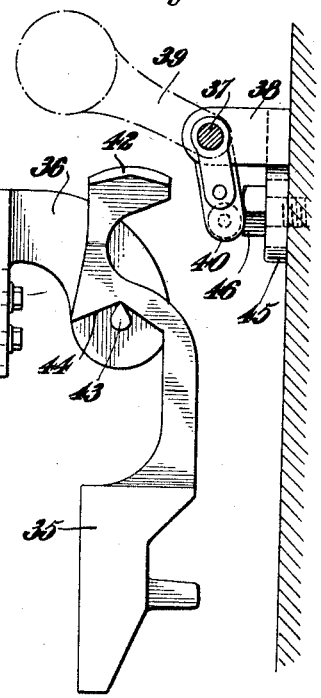
Fig. 5 is a similar view but showing the capacity weight deposited on the beam or lever.

As will be readily understood, the normal weighing capacity of the scale is limited by several factors, such as the effective weight of the pendulum 14, the size of the dial 29, etc. To increase the capacity of the scale when desired, provision is made for depositing a "capacity weight" 35, Figs. 4, 5 and 6, on the nose 36 of the scale beam 9. The effective weight of the capacity weight thus opposes the rocking of the lever by the load-actuated draft rod 12. For this purpose I provide a rock shaft 37, mounted in a bracket 38 on the inside of the beam housing 11 and extending outside of the housing where it is equipped with a weighted arm 39 to counterpoise the parts actuated by the shaft. This arm also serves as a crank for rocking the shaft when the capacity weight is to be deposited on or lifted off the scale beam. The shaft mentioned is provided with a pair of arms 40 having inwardly disposed pins 41 on which the capacity weight is normally suspended by means of the lips 42 on its upper end, as clearly indicated in Figs. 4 and 6. To deposit the capacity weight on the scale beam nose the arm 39 is rocked counterclockwise (as seen in Fig. 4) thereby lifting the weight, carrying it leftwardly over the end of the beam, and lowering it gently upon the knife edges 43 on the nose piece 36, which the weight straddles, as in Fig. 5. The weight is guided to its proper position by the inverted V-shaped edges 44. To remove the weight the shaft 37 is rocked back, thereby bringing the fingers 41 under the lips 42 and lifting the weight off the knife edges. The bracket 38 is adjustable vertically by means of the slot 45, Fig. 5, which receives the fastening screw 46, to bring the shaft 37 and other parts in the proper position relative to the end of the scale beam. The nose piece 36 is provided with a vertical plate 47 having a vertical slot 48, Fig. 7. The plate bears against the end of the scale beam and is fastened by screws 49, thus permitting vertical adjustment of the nose piece on the scale beam. This is a highly advantageous feature. The "range line" of the beam 9, that is, an imaginary line drawn through the fulcrum 10, Fig. 1, the pivot $12^a$ of the draft rod 12, and the pivot $15^a$ of the link 15, should, in general, be parallel to the lower range line in the base-lever system (under the platform), not shown. In the case of the three pivots mentioned (which make the beam a lever of the second order) the position of the range line is controlled by the adjustment of the pendulum 14 on its stem. When, however, the capacity weight is placed on the beam the latter becomes also a lever of the first order, and another range line is established, through the pivots 43, 10 and $12^a$, which must also conform to the lower range line. Heretofore any needed variation in the position of the pivot 43 has been effected by bending the nose piece or by resetting the pivot, both of which methods are troublesome and unsatisfactory. With the nose piece mounted in the manner shown the adjustment can be effected with the greatest ease and accuracy.

It is to be understood that the invention is not limited to the parts herein specifically illustrated and described but can be embodied in other forms without departure from its spirit as defined by the following claims.

I claim:

1. In a scale, in combination, a scale lever, a dial and a pointer adapted to swing thereover, a pinion connected to the pointer to actuate the same, an arm extending from the lever toward the pinion, a rack to rotate the pinion, and a spring supported by the arm, carrying the rack and serving to maintain the same in mesh with the pinion.

2. In a scale, in combination, a scale lever having a fulcrum, a dial and a pointer adapted to swing thereover, a pinion connected with the pointer to actuate the same, an arm extending from the scale lever toward said pinion, an adjustable carrier on the arm, a spring supported by the carrier, and an arc-shaped rack concentric with the fulcrum of the scale lever and carried by and maintained in mesh with the pinion by said spring.

3. In a scale, in combination, a scale lever having a fulcrum, a dial and a pointer to swing thereover, a pinion connected with the pointer to actuate the same, an arm extending from the scale lever toward the pinion, a spring carried by the arm adjacent to the pinion, and an arc-shaped rack, concentric with the fulcrum of the scale lever, carried by the spring and maintained thereby in mesh with the pinion to rotate the latter.

4. In a scale, in combination, a scale lever, a dial and a pointer adapted to swing thereover, a pinion connected with the pointer to actuate the same, an arm extending from the scale lever toward the pinion, a loop spring having one end connected to the arm, and a rack carried by the other end of the spring and maintained by the spring in mesh with the pinion to rotate the same.

5. In a scale, in combination, a scale lever, a dial and a pointer adapted to swing thereover, a pinion connected with the pointer to actuate the same, a two-part arm extending from the scale lever toward the pinion and capable of being shortened or lengthened by turning one part relatively to the other, a spring supported by the arm and rotatively adjustable relatively thereto to compensate for turning the arm-part which supports the spring whereby the spring may be maintained in proper transverse position relative to the axis of the pinion, and a rack carried by and alined with the spring and maintained thereby in mesh with the pinion to rotate the latter.

6. In a scale, in combination, a scale lever, a dial and a pointer adapted to swing thereover, a pinion connected with the pointer to actuate the same, an arm extending from the scale lever toward the pinion, a supporting finger carried by the arm adjacent to the pinion and rotatively adjustable transversely thereto, a rack to rotate the pinion, and a spring supporting the rack and maintaining the same in mesh with the pinion, said spring being carried by the said supporting finger and rotatively adjustable thereon transversely to the arm.

7. In a scale, in combination, a lever having a fulcrum, means actuated by the articles to be weighed and pivotally connected with the lever to rock the same, a capacity weight for increasing the weighing capacity of the lever, means to shift the weight on and off the lever, said lever having a part adjustable vertically and provided with a pivot to support the capacity weight, whereby the said pivot can be raised or lowered to range it properly with the fulcrum of the lever and the point of pivotal connection of the said article-actuated means.

8. In a scale, in combination, a lever having a fulcrum, load-actuated means pivoted to the lever to rock the latter, a capacity weight for increasing the weighing capacity of the lever, a nose piece on the lever, carrying a pivot to suspend the capacity weight and adjustable vertically on the lever to range the pivot properly with the fulcrum of the lever and the pivot of the load-actuated means, and means for shifting the capacity on and off the pivot carried by the nose piece.

9. In a scale, in combination, a lever having a fulcrum, load-actuated means pivoted to the lever to rock the same, and a part carried by the lever and having pivot for connection with a load-opposing weight, said part being vertically adjustable relatively to the rest of the lever whereby said pivot can be properly ranged with the fulcrum of the lever and the pivot of the load-actuated means.

In testimony whereof I hereunto affix my signature.

LOUIS ASHLEY OSGOOD.